United States Patent [19]

Matsushita et al.

[11] Patent Number: 4,555,358
[45] Date of Patent: Nov. 26, 1985

[54] ELECTRICALLY CONDUCTIVE SINTERED CERAMICS AND CERAMIC HEATERS

[75] Inventors: Yasuo Matsushita; Kousuke Nakamura; Koji Harada, all of Hitachi, Japan

[73] Assignee: Hitachi, Ltd., Tokyo, Japan

[21] Appl. No.: 497,577

[22] Filed: May 24, 1983

[30] Foreign Application Priority Data

May 28, 1982 [JP] Japan .................................. 57-89926

[51] Int. Cl.[4] ............................................. H01B 1/04
[52] U.S. Cl. .................... 252/516; 252/518; 252/520; 219/553; 428/446; 501/89; 501/91; 501/92; 373/117
[58] Field of Search ....................... 252/516, 518, 520; 373/117; 501/88, 89, 91, 92; 338/330; 428/446; 219/538, 541, 542, 548, 552, 553

[56] References Cited

U.S. PATENT DOCUMENTS

| | | | |
|---|---|---|---|
| 3,404,202 | 10/1968 | Carlson et al. | 252/516 |
| 3,875,476 | 4/1975 | Crandall et al. | 252/516 |
| 3,895,219 | 7/1975 | Richerson et al. | 252/516 |
| 3,993,602 | 11/1976 | Prochazka | 252/516 |
| 4,209,474 | 6/1980 | Prochazka | 252/516 |

Primary Examiner—Josephine L. Barr
Attorney, Agent, or Firm—Antonelli, Terry & Wands

[57] ABSTRACT

An electrically conductive sintered ceramics of the present invention comprises, as the main ingredients thereof, (a) silicon carbide, (b) an inorganic compound which exhibits a positive resistance-temperature coefficient, and preferably (c) a sintering assistant. The electrically conductive sintered ceramics obtained exhibits a positive resistance-temperature coefficient as a whole.

A ceramic heater of the invention makes use of the electrically conductive sintered ceramics in an electrically conductive portion thereof.

A sintered product which exhibits a positive resistance-temperature coefficient helps to prevent the occurrence of thermal runaway or thermal destruction.

5 Claims, 4 Drawing Figures

ELECTRICALLY CONDUCTIVE SINTERED CERAMICS AND CERAMIC HEATERS

BACKGROUND OF THE INVENTION

1. Field of the Invention

The present invention relates to electrically conductive sintered ceramics and to ceramic heaters using these ceramic.

2. Description of the Prior Art

Silicon carbide has an excellent hardness, strength and resistance against oxidation and corrosion. It is also known that silicon carbide has a large resistance against thermal impact under high-temperature conditions, owing to its small coefficient of thermal expansion and high heat conductivity. Silicon carbide with these excellent characteristics is a promising material for a wide field of industrial applications such as engine parts for automobiles, turbine members, heat exchanger members, crucibles for melting metals, and jigs for use at high temperatures. In order to expand the applications of silicon carbide, attempts have been made to blend silicon carbide with ceramics or intermetallic compounds to improve some characteristic of a sintered product of silicon carbide, or to impart new functions thereto. Examples of such studies are disclosed in the specifications of U.S. Pat. Nos. 3,875,476 and 3,895,219. The sintered products obtained by this prior art, however, have negative resistance-temperature coefficients and present the probability of being destroyed by heat.

Conventional glow plugs can be divided into those of the metal-sheathed type (indirect heating type) and the uncovered coil type (direct heating type). A glow plug of the sheathed type is constructed by pouring a powder of a ceramic having a resistance against heat and heat conductivity, such as magnesium oxide powder, into and around the heat-producing coil in a metal tube. With a glow plug of the uncovered coil type, on the other hand, the heat-producing coil is exposed in the engine.

A glow plug of the former type is rigid and has a great durability against the combustion gases, but is poor in heat transmission, requires a time of longer than 5 seconds before the temperature on the surface of the sheath reaches the starting point, and hence lacks a rapid heating performance. Further, if attempts are made to increase the heating speed, the temperature of the heat-producing coil increases to close to the melting point of the heat-producing element to reduce its durability considerably. Therefore an upper limit of 950° C. is imposed on the surface temperature of the sheath. A glow plug of the latter type, on the other hand, can be heated rapidly, but the heat-producing element is subject to deterioration due to the combustion gases, and short-circuiting can easily develop due to the adhesion of carbon. From the standpoint of corrosion at high temperatures, furthermore, a temperature of 900° C. may be the limit on the surface temperature of the heat-producing coil. Therefore, glow plugs of the sheath type are mainly used at the moment, despite their poor performance for rapid heating.

In recent years, however, an increasing demand had risen for diesel-engined automobiles to start as quickly as gasoline-engined automobiles. Under such circumstances, glow plugs of the direct heating type (surface heating type) have been reconsidered, and there is a strong desire to develop a heater element for glow plugs which can be heated quickly, and which has an excellent durability at high temperatures.

SUMMARY OF THE INVENTION

The object of the present invention is to provide an electrically conductive sintered ceramic material which has an electric conductivity close to that of a metal, and provide a ceramic heater which is composed of the electrically conductive sintered ceramic material and which is free from being destroyed by heat.

The electrically conductive sintered ceramic material or product of the present invention comprises (a) silicon carbide (SiC), (b) an inorganic compound having a positive resistance-temperature coefficient, and preferably (c) a sintering additive, as the main ingredients thereof, the sintered product exhibiting a positive resistance-temperature coefficient.

When a sintered product or inorganic compound having a positive resistance-temperature coefficient is heated, its electrical resistance increases with temperature. If a sintered product has a negative resistance-temperature coefficient as do conventional products, the electrical resistance decreases with increasing temperature, and the current increases under constant-voltage conditions. Namely, heat is produced spontaneously, the electrical resistance decreases correspondingly, and the current increases further, raising the probability of thermal runaway or thermal destruction. Therefore, if a sintered product exhibits a positive resistance-temperature coefficient, thermal runaway or thermal destruction can be prevented by using the sintered product in the electrically conductive part of a ceramic heater. In order for a sintered product to exhibit a positive resistance-temperature coefficient, it is essential that component (b) has a positive resistance-temperature coefficient.

Examples of such a component (b) include zirconium boride ($ZrB_2$) with a resistance-temperature coefficient of $+1.76 \times 10^{-3}$/°C., titanium boride ($TiB_2$) with a resistance-temperature coefficient of $+2.78 \times 10^{-3}$/°C., molbdenum boride ($Mo_2B_5$) with a resistance-temperature coefficient of $+3.3 \times 10^{-3}$/°C., zirconium silicide ($ZrSi_2$) with a resistance-temperature coefficient of $+2.65 \times 10^{-3}$/°C., molybdenum silicide ($MoSi_2$) with a resistance-temperature coefficient of $+6.38 \times 10^{-3}$/°C., tantalum silicide ($TaSi_2$) with a resistance-temperature coefficient of $+3.32 \times 10^{-3}$/°C., titanium nitride (TiN) with a resistance-temperature coefficient of $+2.48 \times 10^{-3}$/°C., zirconium nitride (ZrN) with a resistance-temperature coefficient of $+4.3 \times 10^{-3}$/°C., tantalumn carbide (TaC) with a resistance-temperature coefficient of $+1.07 \times 10^{-3}$/°C., and zirconium carbide (ZrC) with a resistance-temperature coefficient of $+0.95 \times 10^{-3}$/°C. A sintered product having the desired resistance characteristics can be obtained even by adding metal powders. This, however, raises a difficulty concerning resistance to the oxidation at high temperatures, and the material obtained is not suitable in a heater for glow plugs. The above examples of component (b) have melting points of more than 2000° C. and resistivities of less than $10^{-4}$ Ωcm at room temperature.

According to the present invention, the electrically conductive sintered ceramic product should contain between 10 to 200 parts by weight of powder (b) for 100 parts by weight of powder (a). When the amount of component (b) is within this range, (1) the resistivity is less than 1 Ωcm, (2) the resistance-temperature coefficient becomes positive, (3) the sintered product has an increased strength, and (4) an excellent resistance to oxidation is exhibited under high-temperature conditions. The sintering additive (c) should preferably be an aluminum compound or a boron compound, and a quantity of 0.1 to 3% by weight should be used, based on the aluminum and/or boron content. Under this condition, (1) the relative density of the sintered product becomes as high as 85% or higher of the theoretical density, and (2) there is no possibility of any increase in resistivity. The particle diameter of powder (a) should preferably be less than 10 μm.

According to the present invention, a mixture consisting chiefly of component (a), component (b), and preferably component (c) is pre-molded, and is then to be sintered by hot-pressing in a non-oxidizing atmosphere under the conditions of a temperature of between 1700° to 2300° C. and a pressure of between 10 to 500 kg/cm$^2$. If the mixture is sintered in an oxidizing atmosphere, the surfaces of the starting powders are oxidized, making it difficult to obtain a dense sintered product. If the hot-press sintering is effected at a temperature lower than 1700° C., it becomes difficult to obtain a dense sintered product having a relative density of more than 85%. If the hot-press sintering is effected at a temperature higher than 2300° C., on the other hand, the mixture is sintered too much, giving rise to the occurrence of voids which reduce the strength. When the sintering temperature is within above range, hot pressing will usually be effected under a pressure of 10 to 500 kg/cm$^2$, to obtain a very dense sintered product.

The thermal conductivity and thermal expansion coefficient of the silicon carbide type of composite ceramic material can be controlled by substituting less than 50% by weight of component (b) one or more high melting point compounds having melting points of higher than 2000° C. If the additional components have melting points of more than 2000° C., the silicon carbide composite ceramic material produced will not lose any hardness or strength under high-temperature conditions. Further, when the substituted amount is less than 50% by weight of component (b), the composite ceramic material produced will not lose the inherent characteristics of the silicon carbide ceramic material. The substituted amount is preferably less than 30% by weight of component (b).

The ceramic heater of the present invention is characterized in that the electrically conductive sintered ceramics is used for the electrically conductive member thereof, and is suitable for use in a heater of the direct heating type.

When studying heater materials of the direct heating type, the inventors of the present invention have discovered that a rapid heating performance can be achieved if the resistance of the heater is reduced to pass a heavy current instantaneously, that durability under high-temperature conditions can be accomplished if the heater is composed of a material containing compounds having high melting points and resistance to oxidation, and that the heater material should have a positive resistance-temperature coefficient to prevent runaway of current when heat is produced and control the current easily so that the temperature on the surface of the heater is maintained constant because of the resistance-temperature coefficient. Through extensive studies on heater materials having the above characteristics, the inventors have found that the silicon carbide composite sintered ceramic products heretofore described have a low electrical resistivity and a positive resistance-temperature coefficient, and exhibit durability in the high operating temperature ranges of a glow plug heater.

DESCRIPTION OF THE PREFERRED EMBODIMENTS 100 parts by weight of black SiC powder having an average particle diameter of 10 μm was mixed with 2 parts by weight of Al$_2$O$_3$ powder (1% by weight based on the aluminum content) having an average particle diameter of 1 μm, and 80 parts by weight of ZrB$_2$ powder having an average particle diameter of 2 μm. The powder mixture was introduced into a metal mold and was molded under a pressure of 1000 kg/cm$^2$. The molded product was introduced into dies of graphite, and was sintered by the hot-press method at a vacuum pressure of 10$^{-3}$ to 10$^{-5}$ Torr. The sintering was effected under a pressure of 200 kg/cm$^2$, while the temperature was raised from room temperature to 2050° C. over a period of about 2 hours, was maintained at the temperature of 2050° C. for one hour, and then the product was permitted to cool by turning off the power supply. The pressure was reduced after the temperature had dropped to less than 1500° C. The thus obtained composite sintered product (SiC—ZrB$_2$) had a relative density of 98% (relative to the theoretical density of the composition), a bending strength of about 50 kg/mm$^2$ both at room temperature and at 1300° C., a thermal expansion coefficient of 42×10$^{-7}$/°C. (between room temperature and 1000° C.), a resistivity of 5×10$^{-4}$ Ωcm at room temperature, and a resistance-temperature coefficient of about +0.3×10$^{-3}$/°C. (between room temperature and 1000° C.).

Figure 1:
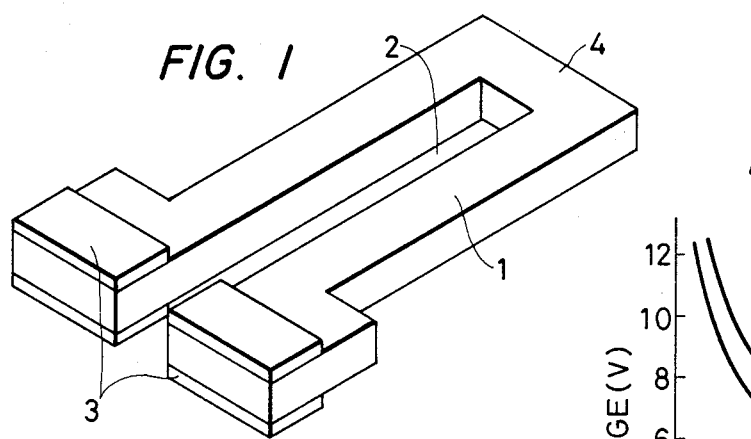
FIG. 1 is a perspective view of a heater for a glow plug according to an embodiment of the present invention.

A cut-out 2 was formed in the thus obtained ZrB$_2$-SiC-type heater material 1 shown in FIG. 1 to obtain a U-shaped glow plug heater, and electrodes 3 were formed at both end portions A, B thereof by attaching a heat-resistant metal such as nickel, so that power-supply wires could be connected thereto. This heater was narrower at the U-shaped end 4, and hence generated the highest temperature at this portion. The heater material exhibited a resistivity of 5×10$^{-4}$ Ωcm at room temperature, and a resistance of about 0.1 ohm across the electrodes A and B at room temperature.

Figure 2:
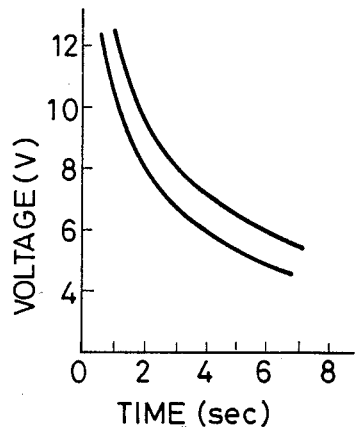
FIG. 2 is a diagram of the temperature-rise characteristics of the heater for a glow plug according to the embodiment of FIG. 1.

FIG. 2 shows the results of heating speed measured by connecting the heater element of FIG. 1 to a d-c power-supply circuit and by changing the voltage applied. The resistivity of the heater was 0.1 ohm, the curve (i) represents the case when the temperature of the heater surface was 1200° C., and the curve (ii) represents the case when the temperature of the heater surface was 900° C. When a voltage of 12 volts, the same as that of a storage battery of a car, was applied, a temperature of 900° C. was reached in about 0.7 second and a temperature of 1200° C. was reached in about 1 second, this is considerably faster than the heating speed of a conventional metal-sheathed heater (which takes 5 to 10 seconds before a temperature of 900° C. is reached). When the heater surface has heated at 1000° C. by passing an electric current therethrough, the heater resistance was about 0.3 ohm and hence it exhibited a positive resistance-temperature coefficient, providing a heater which is suitable for use in a glow plug.

Figure 3:
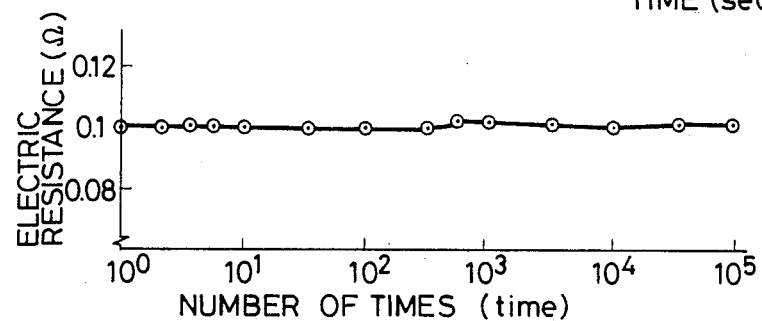
FIG. 3 is a diagram showing the changes of resistance during a current-carrying durability test using the heater for a glow plug according to the embodiment of FIG. 1.

FIG. 3 shows the changes of resistance (at room temperature) during a current-carrying durability test by repeated voltage-application cycles, each cycle consisting of applying a d-c voltage of 8 volts to the heater element of the embodiment of the invention for 2 seconds (the surface temperature reached about 1100° C. after 2 seconds) and halting the flow of current for 30 seconds (the heater element was forcibly air-cooled during this period). In FIG. 3, the abscissa indicates the number of times the cycles were repeated. The resistance did not change at all even after a test of a hundred thousand cycles, and it was proved that the heater element possessed an excellent current-carrying durability and durability against intermittent heating to about 1100° C.

Figure 4:
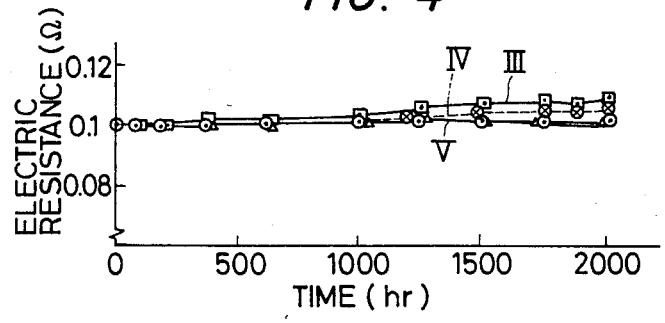
FIG. 4 is a diagram showing the changes of resistance during a high-temperature durability test using the heater for a glow plug according to the embodiment of FIG. 1.

FIG. 4 shows the changes of resistance (at room temperature) during a high-temperature durability test in which heater elements of the embodiment of the invention were heated in air at 900° to 1250° C. in an electric furnace. The curve (iii) shows the case when a heater element was heated at 1250° C., a curve (iv) shows the case when a heater element was heated at 1200° C., and a curve (v) shows the case when a heater element was heated at 900° C., 1000° C. and 1100° C. After heating for 2000 hours (which was considerably severer than the conditions encountered in practice in a vehicle), the resistance changed within +5% when the heater element was heated at less than 1200° C., and by about +10% when heated at more than 1200° C., indicating the excellent durability of the heater element.

Thus, the electrically conductive sintered ceramic product according to the embodiment of the invention has a low resistivity and hence a rapid heating performance as stated above. Further, owing to the positive resistance-temperature coefficient thereof, the electrically conductive sintered ceramic product is not melted by a runaway current even if its glows. Furthermore, the high melting point and resistance to oxidation thereof make the electrically conductive sintered ceramic product of the invention suitable for use as a heater member for a glow plug of the direct heating type for which a rapid temperature-raising speed and durability at high temperatures are required.

The heater material according to the present invention has a high density, a low specific gravity and an increased strength (between room temperature and 1300° C.). Therefore, the heater element can be constructed in a simple form such as rod, plate or U-shaped member. Using the heater material of the embodiment of the invention, therefore, a glow plug can be realized with a simple construction, a small size and a reduced weight when compared with existing metal sheathed glow plugs.

The present invention can be adapted not only to the heater of a glow plug, but also to a variety of heat-generating members, gas-igniting devices, heat-resistant conductors, electrically conductive spacers, and resistors.

According to the present invention as described above, a heater material of the direct heating type is provided which exhibits a rapid heating performance, an excellent durability at high temperatures, and which features a simple construction, small size and reduced weight.

Mixtures consisting chiefly of a powder of black silicon carbide having an average particle diameter of 1 $\mu$m and a powder of component (b) having an average particle diameter of 5 $\mu$m, were molded under a pressure of 1000 kg/cm$^2$, introduced into dies of graphite, and were sintered by a hot press at a vacuum pressure of $10^{-3}$ to $10^{-5}$ Torr. The sintering was effected under a pressure of 300 kg/cm$^2$, the temperature was raised from room temperature to 2050° C. over a period of about 2 hours, it was maintained at 2050° C. for 1 hour, and then the mixture was permitted to cool by turning off the power supply. The pressure was reduced after the temperature had dropped to below 1000° C. The thus obtained silicon carbide composite sintered products, i.e., the electrically conductive sintered ceramic products according to the present invention, and their characteristics, are tabulated below.

TABLE

| Blend composition (% by weight) | Relative density (%) | Hardness $H_D$ (kg/mm$^2$) | Heat conductivity (W/m K) | Coefficient of thermal expansion ($\times 10^{-7}$/°C.) | Resistivity ($\Omega$ cm) |
|---|---|---|---|---|---|
| SiC—60% TiB$_2$ | 91 | 3,000 | 87 | 50 | $4 \times 10^{-4}$ |
| SiC—40% TiB$_2$ | 93 | 2,900 | 82 | 48 | $6 \times 10^{-3}$ |
| SiC—20% TiB$_2$ | 95 | 2,700 | 79 | 45 | 0.8 |
| SiC—40% TiB$_2$—15% ZrB$_2$ | 94 | 2,800 | 80 | 48 | $6 \times 10^{-4}$ |
| SiC—45% TiB$_2$—20% HfB$_2$ | 92 | 2,900 | 81 | 47 | $2 \times 10^{-4}$ |
| SiC—40% TiB$_2$—10% TiC | 95 | 2,900 | 78 | 50 | $1 \times 10^{-3}$ |
| SiC—40% TiB$_2$—10% ZrN | 92 | 2,700 | 76 | 49 | $9 \times 10^{-4}$ |
| SiC—45% TiB$_2$—20% TaC | 91 | 2,600 | 86 | 47 | $1 \times 10^{-4}$ |
| SiC—45% TiB$_2$—10% NbB$_2$ | 93 | 2,500 | 93 | 48 | $3 \times 10^{-4}$ |
| SiC—40% TiB$_2$—5% WC | 94 | 2,500 | 90 | 46 | $2 \times 10^{-3}$ |
| SiC—40% TiB$_2$—5% MoB$_2$ | 94 | 2,500 | 86 | 46 | $1 \times 10^{-3}$ |
| SiC—40% TiB$_2$—10% Al$_2$O$_3$ | 96 | 2,400 | 67 | 61 | $7 \times 10^{-4}$ |
| SiC—50% TiB$_2$—5% B$_4$C | 95 | 3,100 | 71 | 47 | $2 \times 10^{-3}$ |
| SiC—50% TiB$_2$—5% ZrO$_2$ | 97 | 2,700 | 69 | 63 | $2 \times 10^{-3}$ |
| SiC—50% TiB$_2$—5% Si$_3$N$_4$ | 92 | 2,500 | 88 | 46 | $3 \times 10^{-4}$ |
| SiC—65% ZrB$_2$ | 99 | 2,600 | 68 | 47 | $1 \times 10^{-4}$ |
| SiC—40% ZrB$_2$ | 98 | 2,500 | 70 | 45 | $3 \times 10^{-3}$ |
| SiC—20% ZrB$_2$ | 97 | 2,400 | 73 | 43 | 0.1 |
| SiC—40% ZrB$_2$—20% HfB$_2$ | 98 | 2,600 | 72 | 46 | $9 \times 10^{-5}$ |
| SiC—40% ZrB$_2$—10% TiC | 97 | 2,800 | 71 | 48 | $2 \times 10^{-4}$ |
| SiC—40% ZrB$_2$—15% ZrN | 96 | 2,500 | 68 | 46 | $2 \times 10^{-4}$ |
| SiC—40% ZrB$_2$—15% TaB$_2$ | 97 | 2,700 | 66 | 47 | $1 \times 10^{-4}$ |
| SiC—40% ZrB$_2$—10% NbC | 97 | 2,600 | 72 | 46 | $9 \times 10^{-5}$ |
| SiC—40% ZrB$_2$—5% WC | 96 | 2,400 | 70 | 47 | $4 \times 10^{-4}$ |
| SiC—50% ZrB$_2$—5% MoB$_2$ | 98 | 2,300 | 72 | 46 | $2 \times 10^{-4}$ |
| SiC—45% ZrB$_2$—5% Al$_2$O$_3$ | 98 | 2,400 | 65 | 51 | $2 \times 10^{-4}$ |
| SiC—45% ZrB$_2$— | 98 | 2,500 | 67 | 44 | $3 \times 10^{-4}$ |

TABLE-continued

| Blend composition (% by weight) | Relative density (%) | Hardness $H_D$ (kg/mm²) | Heat conductivity (W/m K) | Coefficient of thermal expansion ($\times 10^{-7}/$°C.) | Resistivity ($\Omega$ cm) |
|---|---|---|---|---|---|
| 5% B₄C | | | | | |
| SiC—50% ZrB₂—10% ZrO₂ | 98 | 2,400 | 67 | 52 | $4 \times 10^{-4}$ |
| SiC—50% ZrB₂—5% Si₃N₄ | 94 | 2,500 | 71 | 43 | $1 \times 10^{-4}$ |
| SiC—60% TiN | 99 | 2,400 | 81 | 61 | $8 \times 10^{-4}$ |
| SiC—40% TiN | 98 | 2,300 | 79 | 57 | $1 \times 10^{-2}$ |
| SiC—20% TiN | 98 | 2,200 | 77 | 45 | 0.4 |
| SiC—30% TiN—20% ZrN | 97 | 2,100 | 76 | 51 | $2 \times 10^{-3}$ |
| SiC—30% TiN—20% HfN | 95 | 2,200 | 79 | 49 | $3 \times 10^{-3}$ |
| SiC—60% TiN—25% ZrB₂ | 98 | 2,300 | 70 | 53 | $6 \times 10^{-4}$ |
| SiC—60% TiN—25% TiC | 97 | 2,400 | 72 | 56 | $7 \times 10^{-4}$ |
| SiC—60% TiN—25% TiB₂ | 98 | 2,400 | 84 | 54 | $5 \times 10^{-4}$ |
| SiC—60% TiN—10% TaN | 94 | 2,300 | 81 | 52 | $4 \times 10^{-4}$ |
| SiC—50% TiN—10% B₄C | 98 | 2,400 | 72 | 50 | $6 \times 10^{-3}$ |
| SiC—50% TiN—15% Al₂O₃ | 98 | 2,300 | 68 | 67 | $9 \times 10^{-3}$ |
| SiC—40% TiN—5% Si₃N₄ | 94 | 2,200 | 88 | 47 | $1 \times 10^{-2}$ |
| SiC—40% TiN—10% ZrO₂ | 98 | 2,300 | 73 | 65 | $7 \times 10^{-2}$ |
| SiC—40% TiN—10% ZrC | 97 | 2,200 | 71 | 54 | $6 \times 10^{-3}$ |
| SiC—70% ZrN | 96 | 2,200 | 72 | 45 | $6 \times 10^{-5}$ |
| SiC—50% ZrN | 95 | 2,100 | 70 | 44 | $3 \times 10^{-4}$ |
| SiC—20% ZrN | 95 | 2,100 | 70 | 42 | 0.3 |
| SiC—30% ZrN—10% HfN | 92 | 2,300 | 68 | 40 | $2 \times 10^{-3}$ |
| SiC—40% ZrN—10% ZrB₂ | 96 | 2,300 | 67 | 46 | $2 \times 10^{-4}$ |
| SiC—30% ZrN—10% TiC | 95 | 2,400 | 63 | 49 | $4 \times 10^{-3}$ |
| SiC—35% ZrN—15% TiB₂ | 96 | 2,400 | 76 | 44 | $2.5 \times 10^{-4}$ |
| SiC—35% ZrN—10% TaN | 93 | 2,100 | 75 | 43 | $4 \times 10^{-4}$ |
| SiC—35% ZrN—5% B₄C | 95 | 2,200 | 63 | 40 | $1 \times 10^{-2}$ |
| SiC—30% ZrN—10% Al₂O₃ | 96 | 2,200 | 60 | 56 | 0.1 |
| SiC—30% ZrN—5% Si₃N₄ | 92 | 2,100 | 75 | 40 | $8 \times 10^{-2}$ |
| SiC—30% ZrN—10% ZrO₂ | 97 | 2,100 | 62 | 53 | $6 \times 10^{-2}$ |
| SiC—30% ZrN—10% ZrC | 95 | 2,100 | 73 | 41 | $4 \times 10^{-3}$ |

As explained above, electrically conductive sintered ceramics of the above compositions have resistivities of smaller than 1 $\Omega$cm.

What is claimed is:

1. A ceramic heater comprising a heater element consisting of an electrically-conductive, sintered ceramic body and heat-resistant metallic elements adapted to connect power-supply wires to both ends of said heater element, said ceramic body consisting essentially of (a) silicon carbide and (b) a non-oxide ceramic material other than silicon carbide which exhibits a positive resistance-temperature coefficient, said component (b) consisting of at least one substance selected from the group consisting of zirconium boride, titanium boride, zirconium silicide, molybdenum silicide, tantalum silicide, titanium nitride, zirconium nitride, tantalum carbide, zirconium carbide, titanium carbide, tantalum boride, hafnium boride, hafnium nitride, niobium boride, niobium carbide and tungsten carbide, the quantity of powder of said component (b) being 10 to 200 parts by weight based on 100 parts by weight of power of said component (a), said electrically-conductive, sintered ceramic body thereby exhibiting a generally positive resistance-temperature coefficient and a resistivity smaller than 1 $\Omega$cm.

2. A ceramic heater comprising a heater element consisting of an electrically-conductive, sintered ceramic body and heat-resistant metallic elements adapted to connect power-supply wires to both ends of said heater element, said ceramic body consisting essentially of (a) silicon carbide, (b) a non-oxide ceramic material other than silicon carbide which exhibits a positive resistance-temperature coefficient and (c) a sintering additive, said component (b) consisting of at least one substance selected from the group consisting of zirconium boride, titanium boride, zirconium silicide, molybdenum silicide, tantalum silicide, titanium nitride, zirconium nitride, tantalum carbide, zirconium carbide, titanium carbide, tantalum boride, hafnium boride, hafnium nitride, niobium boride, niobium carbide and tungsten carbide, the quantity of powder of said component (b) being 10 to 200 parts by weight based on 100 parts by weight of powder of said component (a), said electrically-conductive, sintered ceramic body thereby exhibiting a generally positive resistance-temperature coefficient and a resistivity smaller than 1 $\Omega$cm, and said sintering additive (c) consisting of a substance selected from the group consisting of an aluminum compound and a boron compound, the quantity of said sintering additive in the mixture of (a), (b) and (c) being between 0.1 to 3% by weight, based on the aluminum or boron content.

3. A ceramic heater according to claim 1 or 2, wherein the quantity of powder of said component (b) being 20 to 200 parts by weight based on 100 parts by weight of powder of said component (a).

4. A ceramic heater according to claim 1 or 2, wherein said electrically-conductive, sintered ceramic body is obtained by hot-pressing and sintering a starting mixture of the components in particulate from in a non-oxidizing atmosphere at a temperature of between 1700°–2300° C. under a pressure of between 10–500 kg/cm².

5. A ceramic heater according to claim 2, wherein said sintering additive is selected from the group consisting of Al₂O₃, MoB₂ and B₄C.

* * * * *